United States Patent
Tricoukes et al.

(10) Patent No.: US 10,621,746 B2
(45) Date of Patent: Apr. 14, 2020

(54) METHODS AND APPARATUS FOR RAPIDLY DIMENSIONING AN OBJECT

(71) Applicant: SYMBOL TECHNOLOGIES, LLC, Lincolnshire, IL (US)

(72) Inventors: Nicole Daphne Tricoukes, Seaford, NY (US); Michael J. Giannetta, Centerport, NY (US); Matthew Louis Kowalski, Merrick, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 161 days.

(21) Appl. No.: 15/806,203

(22) Filed: Nov. 7, 2017

(65) Prior Publication Data
US 2019/0139250 A1 May 9, 2019

(51) Int. Cl.
G06K 9/00 (2006.01)
G06T 7/62 (2017.01)
G06T 7/13 (2017.01)
G06T 7/73 (2017.01)
H04N 7/18 (2006.01)

(52) U.S. Cl.
CPC .................. *G06T 7/62* (2017.01); *G06T 7/13* (2017.01); *G06T 7/74* (2017.01); *G06T 2207/10012* (2013.01); *G06T 2207/10016* (2013.01); *G06T 2207/10021* (2013.01); *G06T 2207/20101* (2013.01); *G06T 2207/30204* (2013.01); *H04N 7/181* (2013.01)

(58) Field of Classification Search
CPC .... G06T 7/62; G06T 7/74; G06T 7/13; G06T 2207/30204; H04N 7/181

USPC ......................................................... 382/103
See application file for complete search history.

(56) References Cited

U.S. PATENT DOCUMENTS

| | | | |
|---|---|---|---|
| 9,102,055 B1* | 8/2015 | Konolige | B25J 9/163 |
| 2014/0104414 A1 | 4/2014 | McCloskey et al. | |
| 2014/0255918 A1 | 8/2014 | Olasagasti et al. | |
| 2014/0340524 A1* | 11/2014 | Holz | G06K 9/00335 |
| | | | 348/169 |
| 2015/0170378 A1* | 6/2015 | Moran | G06K 9/4604 |
| | | | 348/135 |
| 2016/0147408 A1* | 5/2016 | Bevis | G06F 3/04815 |
| | | | 715/850 |
| 2017/0017301 A1* | 1/2017 | Doornenbal | G06F 3/017 |
| 2017/0236265 A1 | 8/2017 | Zheng et al. | |
| 2018/0218513 A1* | 8/2018 | Ho | G06T 7/73 |

OTHER PUBLICATIONS

International Search Report and Written Opinion for International Application No. PCT/US2018/056425 dated Feb. 7, 2019.

* cited by examiner

*Primary Examiner* — Jonathan S Lee
(74) *Attorney, Agent, or Firm* — Yuri Astvatsaturov

(57) ABSTRACT

Methods and apparatus for rapidly dimensioning an object are provided. An example method includes capturing, by a plurality of cameras, image data representative of an object; analyzing, by a processor, the image data to identify a plurality of candidate corners of the object; detecting, by the processor, a proximity of an appendage to each of the candidate corners; confirming, by the processor, based on respective proximities of the appendage to the candidate corners of the object, that a first one of the candidate corners is a corner of the object; and calculating, by the processor, based on the confirmed corner of the object, a dimension of the object.

18 Claims, 11 Drawing Sheets

1

METHODS AND APPARATUS FOR RAPIDLY DIMENSIONING AN OBJECT

BACKGROUND

In an inventory environment, such as a retail store, a warehouse, a shipping facility, etc., it is useful to know the dimensions of a box object. Existing imaging systems are capable of estimating the dimensions of a box object by identifying corners of the box object. However, these existing systems can often take a very long time to identify the actual corners of the box object from among all potential corners. Moreover, errors in dimensioning may occur if actual corners are incorrectly identified.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts disclosed herein, and explain various principles and advantages of those embodiments.

Figure 1:
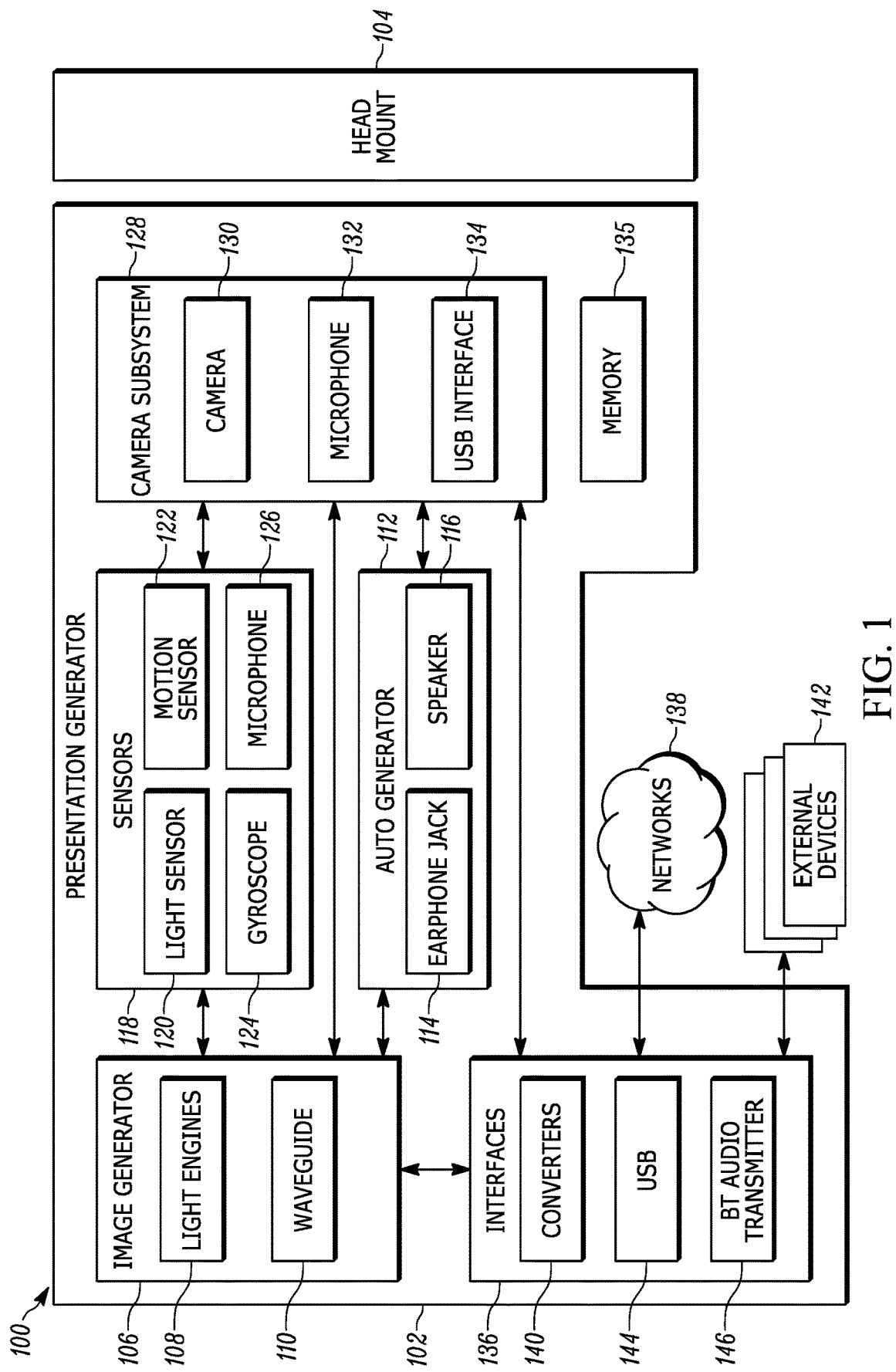
FIG. 1 is a block diagram of an example HUD assembly constructed in accordance with some embodiments

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments disclosed herein.

The apparatus and method components have been represented where appropriate by conventional symbols in the drawings, showing only those specific details that are pertinent to understanding the embodiments disclosed herein so as not to obscure the disclosure with details that will be readily apparent to those of ordinary skill in the art having the benefit of the description herein.

DETAILED DESCRIPTION

Systems and methods are provided for rapidly dimensioning a box object. The systems and methods may include a plurality of cameras configured to capture image data representative of an object. A processor may analyze the image data to identify a plurality of candidate corners of the object and detect a proximity of an appendage to each of the candidate corners. Based on the proximity of the appendage to each candidate corners of the object, one of the candidate corners of the object is confirmed as a corner of the object. Once at least two corners of the object are identified and confirmed, the processor may calculate the dimensions and/or volume of the object based on the actual corners of the box object. Advantageously, the actual corners of the object may quickly be identified from amongst the candidate corners, greatly reducing processing time and speeding up dimensioning.

FIG. 1 is a block diagram of an example HUD assembly 100 constructed in accordance with teachings of this disclosure. Alternative implementations of the example HUD assembly 100 of FIG. 1 include one or more additional or alternative elements, processes and/or devices. In some examples, one or more of the elements, processes and/or devices of the example HUD assembly 100 of FIG. 1 may be combined, divided, re-arranged or omitted.

The example HUD assembly 100 of FIG. 1 includes a presentation generator 102 and a head mount 104. The head mount 104 is constructed to mount the presentation generator 102 to a head of a person such that a presentation generated by the presentation generator 102 is consumable by the person. The presentation includes visual media components (e.g., images) and/or audio media components. To generate images such as static or animated text and/or graphics, the example presentation generator 102 of FIG. 1 includes an image generator 106. The example image generator 106 of FIG. 1 is in communication with one or more sources of image data. The image data received at the image generator 106 is representative of, for example, text, graphics and/or augmented reality elements (e.g., information overlaid on objects within the field of view). The example image generator 106 of FIG. 1 includes light engines 108 that convert the received image data into patterns and pulses of light. The light engines 108 communicate the generated light to a waveguide 110, such that the images corresponding to the received data are displayed to the user via the waveguide 110. In some examples, the light engines 110 include optics that condition or manipulate (e.g., polarize and/or collimate) the generated light prior to providing the light to the waveguide 110. While the example image generator 106 utilizes the light engines 108 and the waveguide to present visual components of the presentation, the example HUD assembly 100 of FIG. 1 can employ any suitable image generating technology such as, for example, cathode ray tube (CRT) devices or scanning lasers.

In the example of FIG. 1, the light engines 108 utilize a light source (e.g., light emitting diodes [LEDs]) to generate light based on the received data. In some examples, the light engines 108 receive processed data in condition for immediate conversion into light. In some examples, the light engines 108 process raw image data before converting the image data into light. To perform such processing, the example light engines 108 of FIG. 1 include and/or are in communication with one or more logic circuits configured to process the image data.

The example waveguide 110 of FIG. 1 carries the light received from the light engines 108 in a direction and pattern corresponding to the image data. In the illustrated example, the waveguide 110 includes a plurality of internal surfaces that form a light guide to internally reflect the light as the light travels from an input to an output. The example waveguide 110 includes gratings at the output to diffract the light towards an eye of the user, thereby displaying the image to the user. The example waveguide 110 of FIG. 1 includes first and second lenses arranged to be placed over first and second eyes, respectively, of the user. However, any suitable shape or size is possible for the waveguide 110. In the illustrated example, the waveguide 110 is transparent such that the user can view surroundings simultaneously with the displayed image, or the surroundings only when no image is displayed on the waveguide 110.

The example presentation generator 102 of FIG. 1 includes an audio generator 112 that receives audio data and converts the audio data into sound via an earphone jack 114 and/or a speaker 116. In some examples, the audio generator 112 and the image generator 106 cooperate to generate an audiovisual presentation.

In the example of FIG. 1, the example presentation generator 102 includes (e.g., houses) a plurality of sensors 118. In the example of FIG. 1, the plurality of sensors 118 include a light sensor 122, a motion sensor 124 (e.g., an accelerometer), a gyroscope 126 and a microphone 128. In some instances, the plurality of sensors 118 may include a sensor configured to detect signals transmitted by a Bluetooth low energy radio, e.g., associated with an appendage of a user. In some examples, the presentation generated by the example image generator 106 and/or the audio generator 112 is affected by one or more measurements and/or detections generated by one or more of the sensors 118. For example, a characteristic (e.g., degree of opacity) of the display generated by the image generator 106 may depend on an intensity of ambient light detected by the light sensor 120. Additionally or alternatively, one or more modes, operating parameters, or settings are determined by measurements and/or detections generated by one or more of the sensors 118. For example, the presentation generator 102 may enter a standby mode if the motion sensor 122 has not detected motion in a threshold amount of time.

The example presentation generator 102 of FIG. 1 includes a camera sub-system 128. In some examples, the camera sub-system 128 is mounted to or carried by the same housing as the presentation generator 102. In some examples, the camera sub-system 128 is mounted to or carried by the head mount 104. The example camera sub-system 128 includes at least two cameras 130 and a microphone 132 to capture image data and audio data, respectively, representative of an environment surrounding the HUD assembly 100. In some examples, image and/or audio data captured by the cameras 130 and/or microphone 132 is integrated with the presentation generated by the image generator 106 and/or the audio generator 112. For example, the camera sub-system 128 of FIG. 1 communicates data to the image generator 102, which may process the image data and to generate one or more corresponding images on the waveguide 110. In some examples, the image data and/or audio data captured by the cameras 130 and/or the microphone 132, respectively, is stored in memory 135 of the example HUD assembly 100. In some examples, the image data and/or audio data captured by the cameras 130 and/or the microphone 132, respectively, is communicated via, for example, a USB interface 134 of the camera sub-system 128 to a device (e.g., a server or external memory) external to the HUD assembly 100.

The example presentation generator 102 of FIG. 1 includes a plurality of interfaces 136 configured to enable the HUD assembly 100 to communicate with one or more external devices 136 and one or more networks 138. In the example of FIG. 1, the interfaces 136 include converters 140 (e.g., an HDMI to LVDS-RGB converter) to convert data from one format to another, a USB interface 142, and a Bluetooth® audio transmitter 146. In some examples, the example Bluetooth® audio transmitter 146 cooperates with one or both of the microphones 126, 132 of the HUD assembly 100 to receive voice input from the user and to convey the voice input to one or more of the external devices 136. For example, voice input may be provided to a mobile computing device being worn by the user via the HUD assembly 100 using the Bluetooth® audio transmitter 146. Examples external devices 136 include keypads, Bluetooth® click buttons, smart watches, and mobile computing devices.

The example image generator 106, the example light engines 108, the example audio generator 112, the example camera-sub-system 128, the example converters 140, the example USB interfaces 134, 144 and/or, more generally, the example presentation generator 102 of FIG. 1 are implemented by hardware, software, firmware, and/or any combination of hardware, software and/or firmware. In some examples, at least one of the example image generator 106, the example light engines 108, the example audio generator 112, the example camera-sub-system 128, the example converters 140, the example USB interfaces 134, 144 and/or, more generally, the example presentation generator 102 of FIG. 1 is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations.

Some example logic circuits are hardware that executes machine-readable instructions to perform operations. Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) can be stored. Further, as used herein, each of the terms "tangible machine-readable medium," "non-transitory machine-readable medium" and "machine-readable storage device" is expressly defined to exclude propagating signals. That is, as used in any claim of this patent, a "tangible machine-readable medium" cannot be read to be implemented by a propagating signal. Further, as used in any claim of this patent, a "non-transitory machine-readable medium" cannot be read to be implemented by a propagating signal. Further, as used in any claim of this patent, a "machine-readable storage device" cannot be read to be implemented by a propagating signal.

As used herein, each of the terms "tangible machine-readable medium," "non-transitory machine-readable medium" and "machine-readable storage device" is expressly defined as a storage medium on which machine-readable instructions are stored for any suitable duration of time (e.g., permanently, for an extended period of time (e.g., while a program associated with the machine-readable instructions is executing), and/or a short period of time (e.g., while the machine-readable instructions are cached and/or during a buffering process)).

Figure 2A:
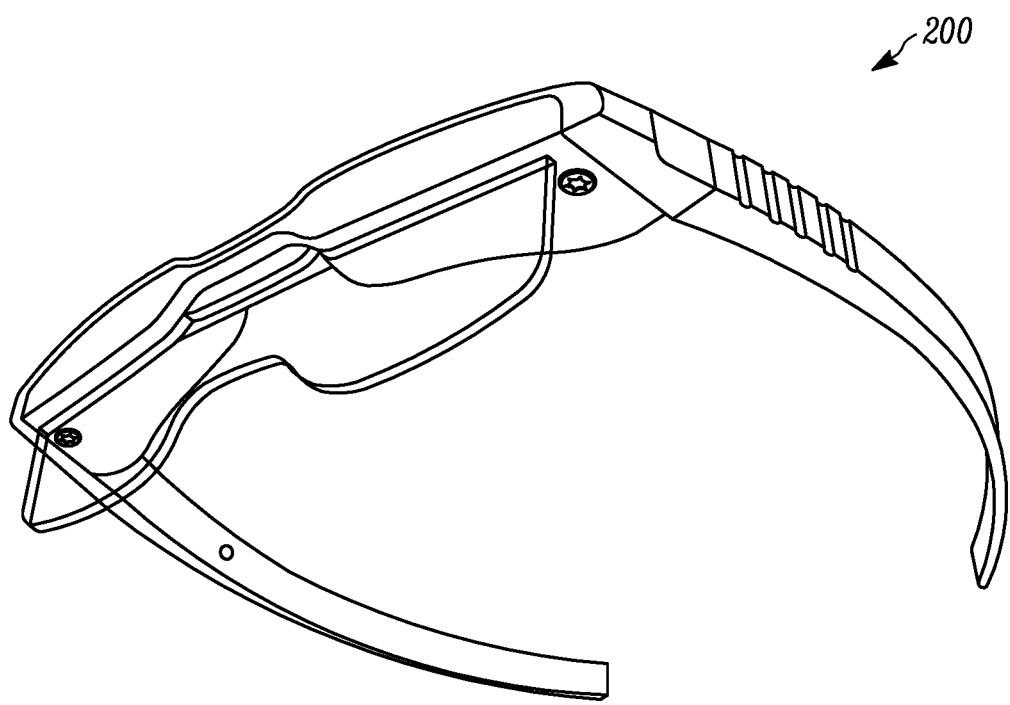
FIGS. 2A and 2B illustrate an example HUD assembly that may implement the example HUD assembly of FIG. 1 in accordance with some embodiments.
Figure 2B:
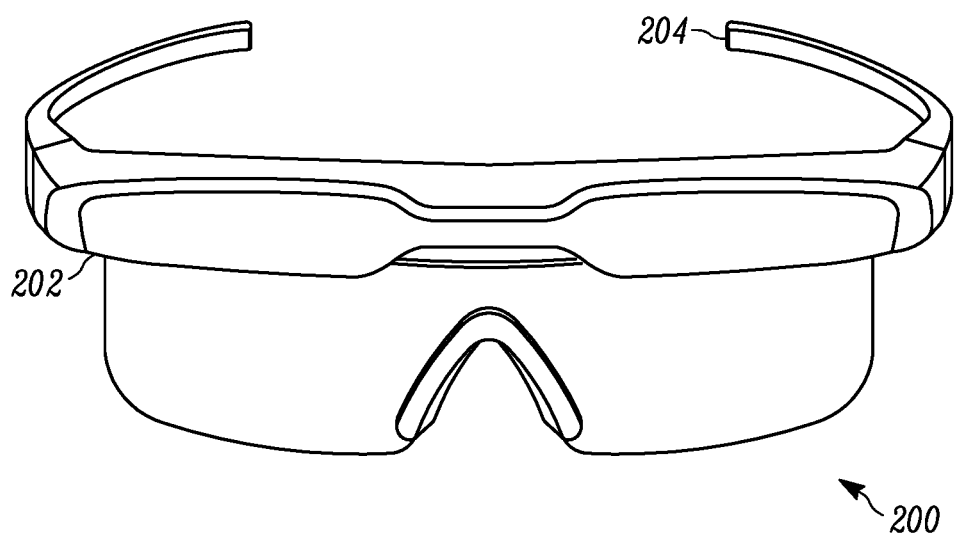

FIGS. 2A and 2B illustrate an example HUD assembly 200 that may implement the example HUD assembly 100 of FIG. 1. The example HUD assembly 200 of FIG. 2A includes a presentation generator 202 and an example head mount 204. The example presentation generator 202 of FIG. 2A houses or carries components configured to generate, for example, an audiovisual presentation for consumption by a user wearing the example HUD assembly 200 of FIG. 2A. For example, the presentation generator 202 of FIG. 2A houses or carries the components of the example presentation generator 102 of FIG. 1.

Figure 3:
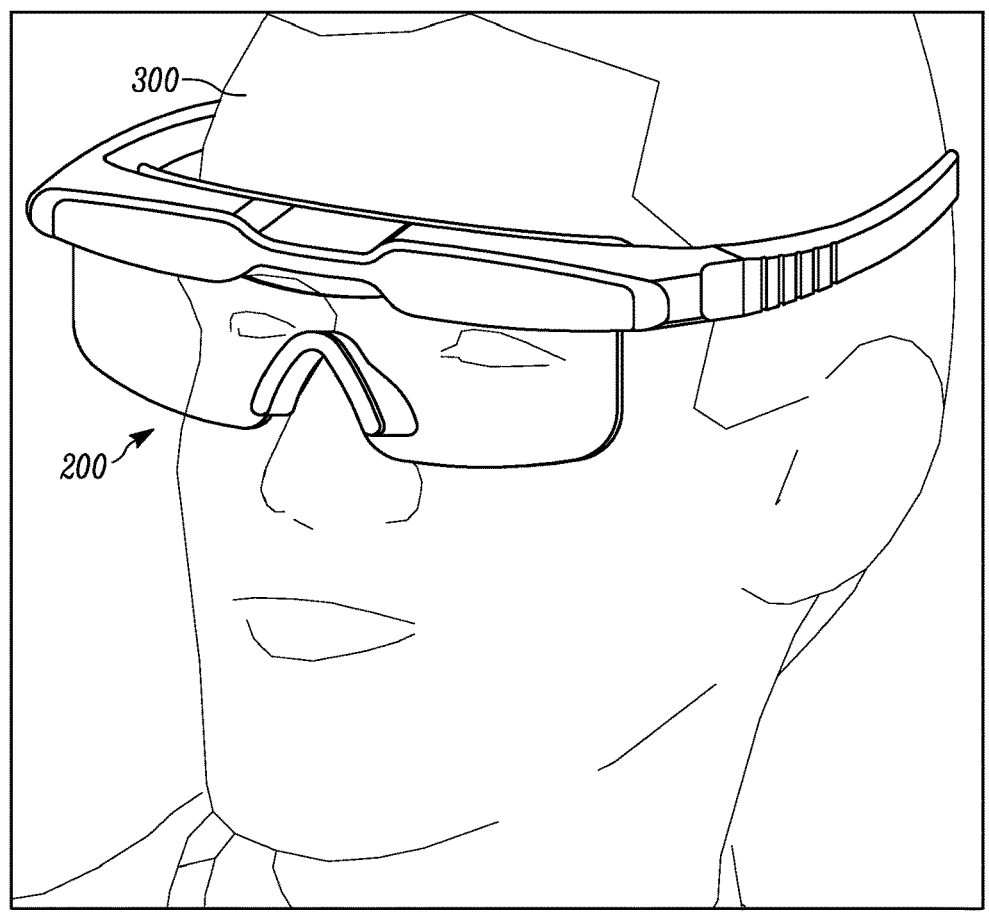
FIG. 3 illustrates the example HUD assembly of FIGS. 2A and 2B mounted to a head of a user in accordance with some embodiments.

FIG. 3 illustrates the example HUD assembly 200 of FIGS. 2A and 2B mounted to a head 300 of a user.

Figure 4:
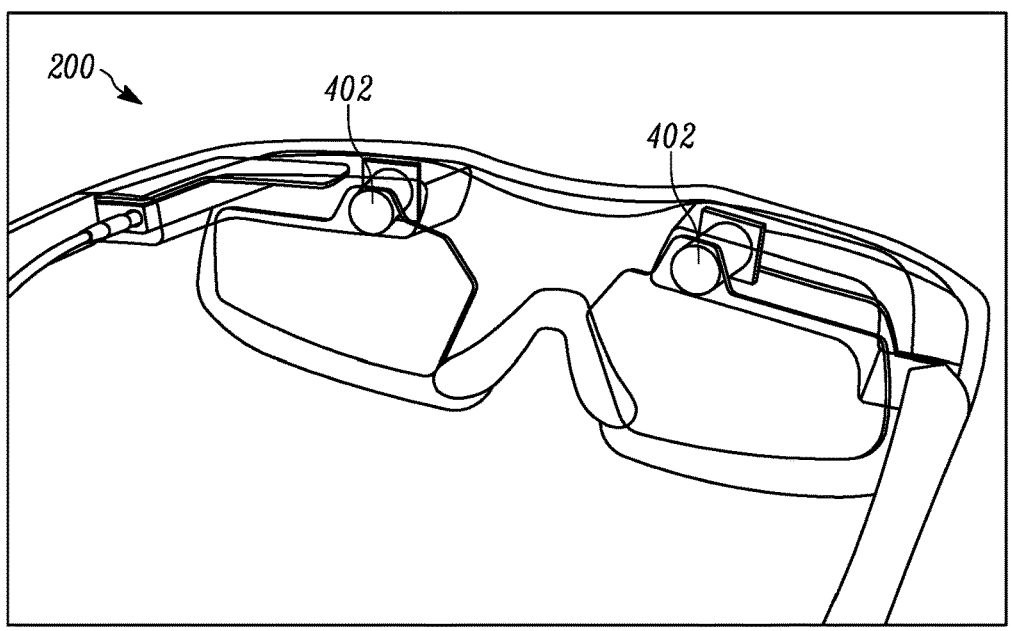
FIG. 4 illustrates example light engines mounted to an example HUD assembly in accordance with some embodiments.
Figure 5:
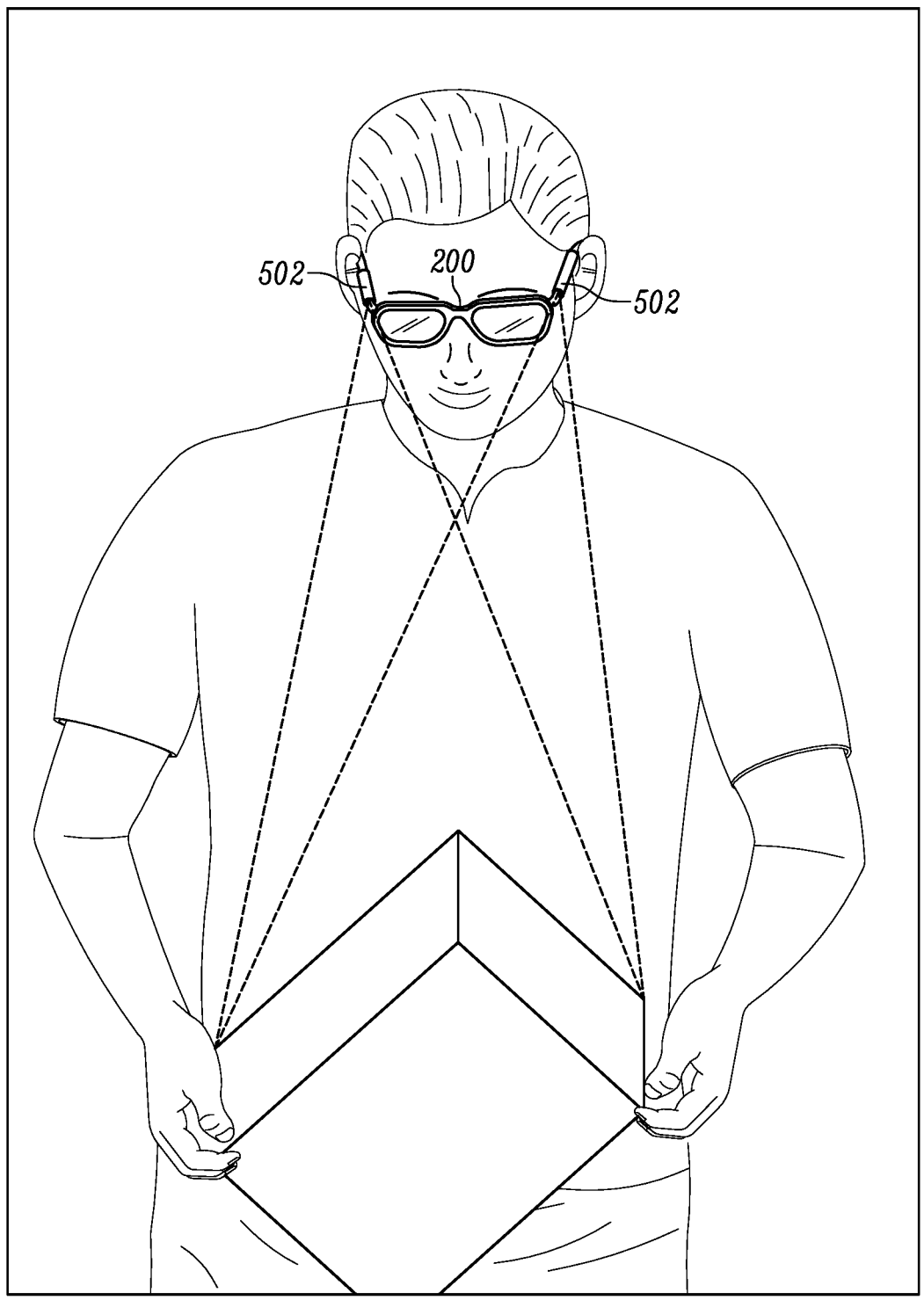
FIG. 5 illustrates a user wearing an example HUD assembly having cameras mounted thereto with the user looking at an example box object to be dimensioned in accordance with some embodiments.

FIG. 4 illustrates example light engines 402 that implement, for example, the light engines 108 of FIG. 1. As described above, the light engines 402 generate light to be carried by the waveguide. The cameras 402 may be configured to capture image data representative of a box object and the hands of a user when a user wearing the HUD assembly 200 looks at a box object. While the example light engines 402 of FIG. 4 are positioned above each eyepiece, the light engines 402 may be positioned in any suitable location such as, for example, at the edge of the frames. For example, FIG. 5 illustrates a user wearing the HUD assembly 200 and looking at a box object, with cameras 502, mounted at the sides of the head mount, capturing image data including the box object and the hands of the user.

Figure 6:
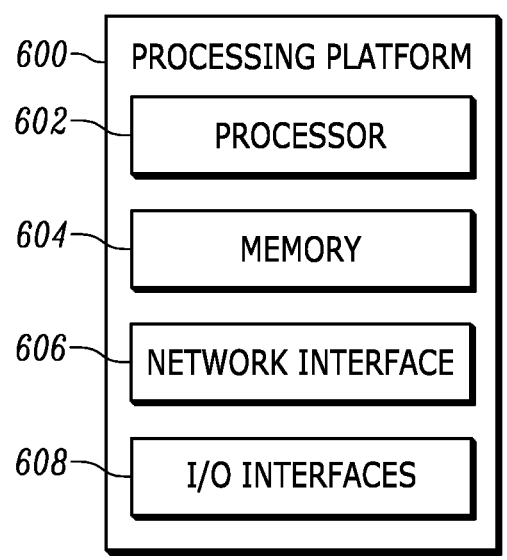
FIG. 6 is a block diagram representative of an example logic circuit in accordance with some embodiments.

FIG. 6 is a block diagram representative of an example logic circuit that may be utilized to implement, for example, the example image generator 106, the example light engines 108, one or more of the example interfaces 136 and/or the example audio generator 112 of FIG. 1. The example logic circuit of FIG. 6 is a processing platform 600 capable of executing machine-readable instructions to, for example, implement operations associated with the example HUD assembly 100 of FIG. 1.

The example processing platform 600 of FIG. 6 includes a processor 602 such as, for example, one or more microprocessors, controllers, and/or any suitable type of processor. The example processing platform 600 of FIG. 600 includes memory (e.g., volatile memory, non-volatile memory) accessible by the processor 602 (e.g., via a memory controller). The example processor 602 interacts with the memory 604 to obtain, for example, machine-readable instructions stored in the memory 604. Additionally or alternatively, machine-readable instructions may be stored on one or more removable media (e.g., a compact disc, a digital versatile disc, removable flash memory, etc.) that may be coupled to the processing platform 600 to provide access to the machine-readable instructions stored thereon. In particular, the machine-readable instructions stored on the memory 604 may include instructions for carrying out any of the methods described in greater detail below at FIGS. 11-14.

The example processing platform 600 of FIG. 6 further includes a network interface 606 to enable communication with other machines via, for example, one or more networks. The example network interface 606 includes any suitable type of communication interface(s) (e.g., wired and/or wireless interfaces) configured to operate in accordance with any suitable protocol(s). The example processing platform 600 of FIG. 6 includes input/output (I/O) interfaces 608 to enable receipt of user input and communication of output data to the user.

Figure 7:
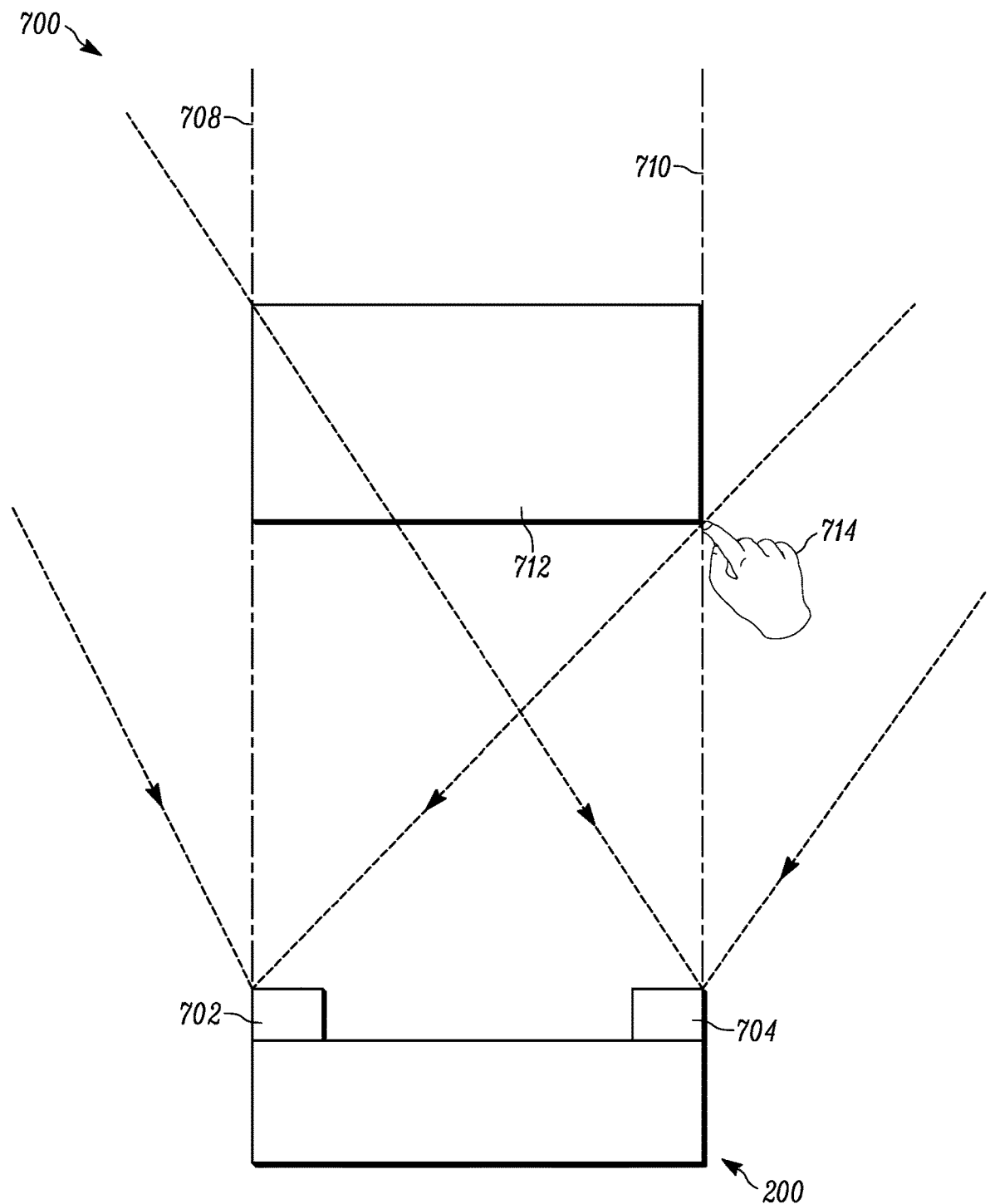
FIG. 7 is a schematic of an imaging system using a HUD assembly in accordance with some embodiments.

FIG. 7 is a schematic of an imaging system 700 using a HUD assembly such as HUD assembly 100 and/or HUD assembly 200 in accordance with some embodiments. The imaging system 700 in FIG. 7 includes two cameras 702 and 704 mounted to or carried by the HUD assembly 200, e.g., as shown in FIG. 5. The cameras 702, 704 operate to capture light along respective optical paths/axes 708, 710. Generally, the cameras are designed to operate together for capturing light scattered or reflected from target object(s) (e.g., the box object 712, a user appendage 714) as pixel data over a two-dimensional imaging field of view (FOV).

Figure 8:
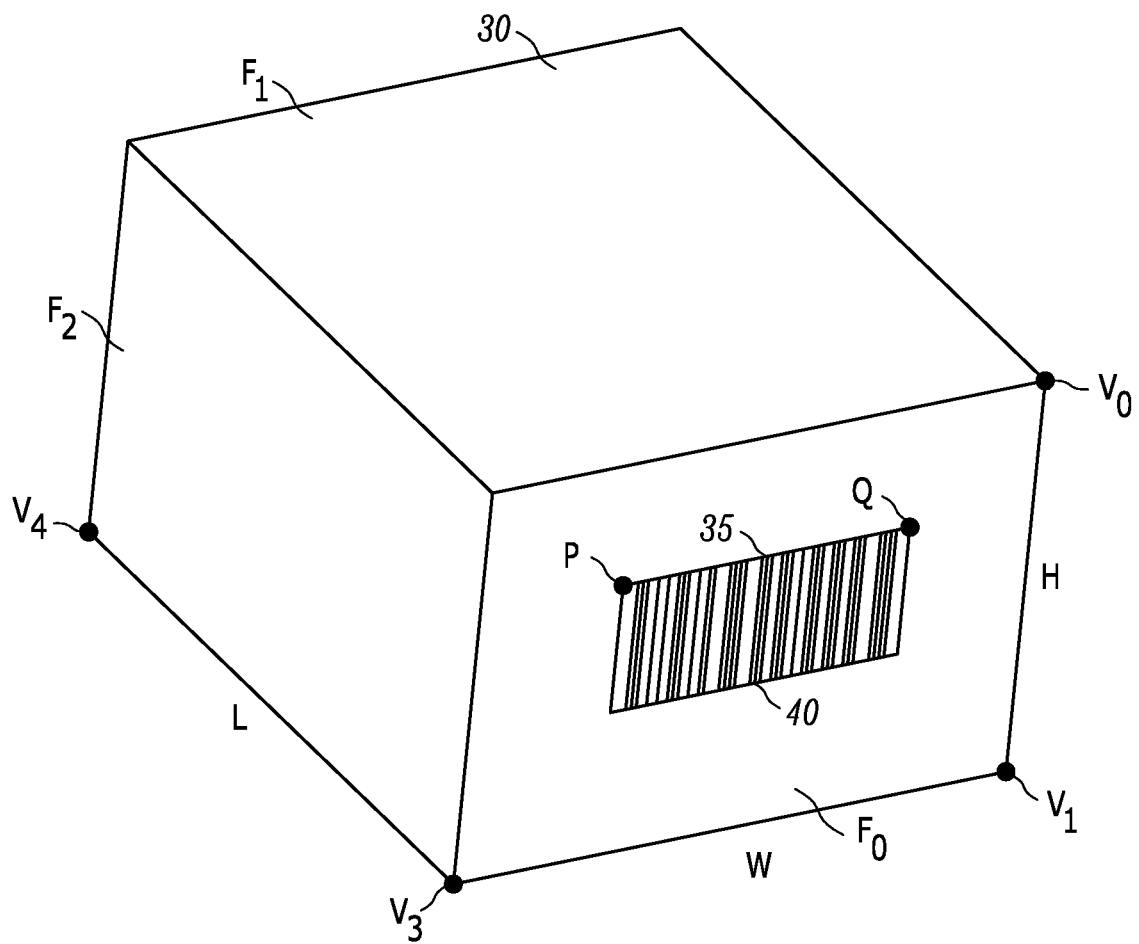
FIG. 8 shows that a barcode is placed on the surface of a box object in accordance with some embodiments.

In some operation environments, as shown in FIG. 8, a barcode 40 is placed on one or more sides of a box object 30, and the imaging system 700 is used to decode the barcode 40 for identifying the box object or finding other information of the box object. In accordance with some embodiments, if the size of the barcode 40 (e.g., its width or its length) is known, the volume or the three box dimensions (i.e., the length, the width, and the height) of the box object 30 can be estimated if the box object 30 and the barcode 40 are both captured in an image by the imaging system 700. In general, if the distance between two points on a geometric mark 35 on the box object 30 is known, the volume or the three box dimensions of the box object 30 can be estimated from the image of the box object 30 as captured by the imaging system 50. Examples of the geometric mark 35 include a one-dimensional barcode, a two-dimensional barcode, a logo, a shipping label, or the combination of isolated point marks printed on the face of the box object 30. Example methods and apparatus for dimensioning a box object in such a manner are disclosed in U.S. Pat. No. 9,741,134, filed Dec. 16, 2013, which is hereby incorporated herein by reference.

Figure 9A:
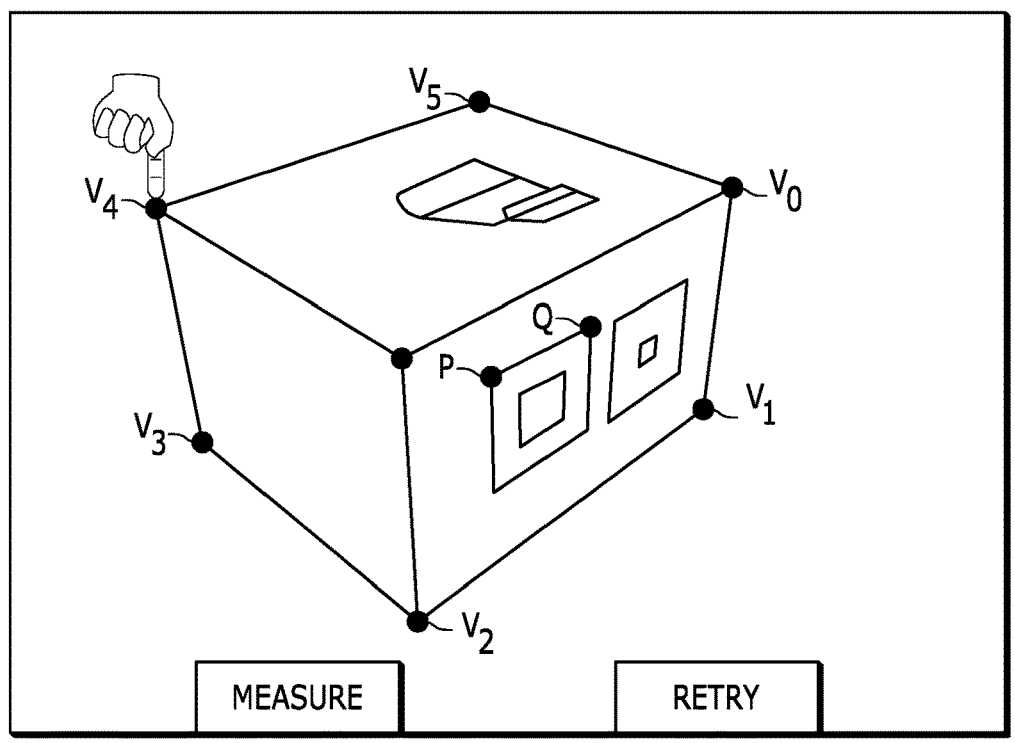
FIG. 9A is an example of a display that would be seen by a user of the HUD assembly when dimensioning a box object, showing a captured image of the box object with the geometric mark on one face of the box object, in accordance with some embodiments.

FIG. 9A is an example of a display screen that would be seen by a user of the HUD assembly when dimensioning a box object. Specifically, FIG. 9A shows a captured image of the box object 30 with the geometric mark 35 on one face of the box object 30 in accordance with some embodiments. In this example, the geometric mark 35 has the shape of a rectangular solid, and two corner points of the geometric mark 35 are used as two reference points "P" and "Q" on a surface of the box object 30 as shown in FIG. 8. In FIG. 9A, these two reference points in the captured image are labeled as "P" and "Q". The positions of these two reference points in the captured image can be identified automatically with the imaging system 50, as disclosed in U.S. Pat. No. 9,741,134. In the illustrated example, a user may touch or point to the reference points to inform the imaging system 50 of the location of the reference points. That is, the imaging system 50 can use the recognizable (e.g., based on a comparison with an image or shape known to correspond to an appendage such as a finger) image of the user's appendage to learn and/or confirm the location of the reference points. In some embodiments, more than two reference points are used for performing a calculation (e.g., a volume of the box object) or algorithm, and the position of any of these more than two reference points in the captured image can be identified automatically with the imaging system 50 or identified by the user manually.

Figure 9B:
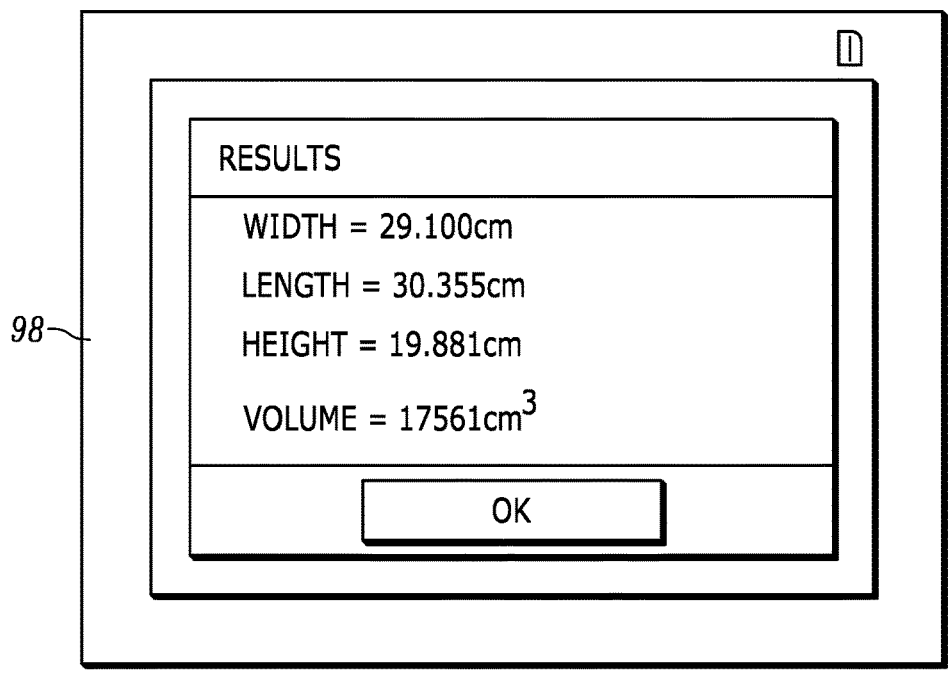
FIG. 9B is an example of a display that would be seen by a user of the HUD assembly when dimensioning a box object, in which the box dimensions and the volume of the box object are displayed, in accordance with some embodiments.

Similarly, the box object in the captured image can be identified by the six corners v0, v1, v2, v3, v4, and v5. As described in detail below, examples disclosed herein utilize the ability of the imaging system 50 to recognize a user's appendage (e.g., based on image recognition or a recognizable marker worn by the user) to indicate and/or confirm the positions of these six corner points of the box object in the captured image. The confirmed positions of the corner points are used to determine one or more dimensions of the box object. FIG. 9B depicts an example of a display screen 98 that would be seen by a user of the HUD assembly when the one or more dimensions of the box object have been calculated.

Figure 10C:
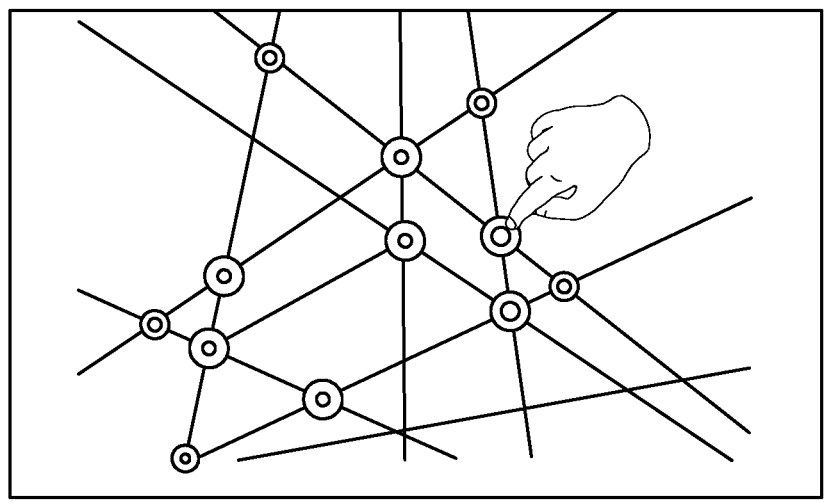
FIG. 10C shows some points in the captured image that are potential corner points of the box object in accordance with some embodiments.
Figure 10B:
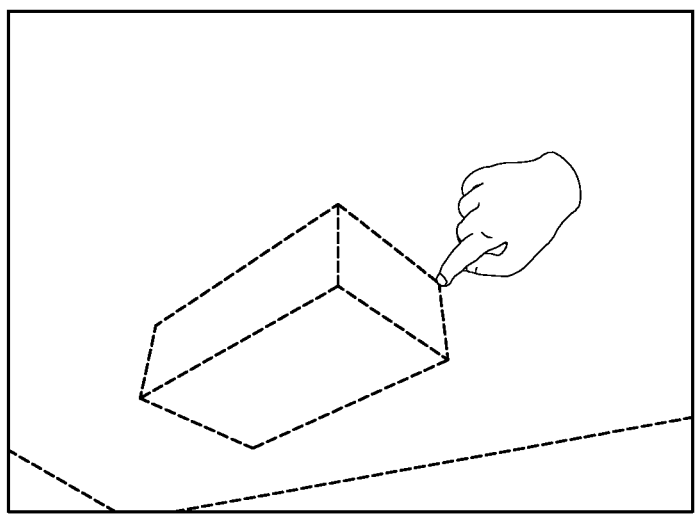
FIG. 10B shows some edge lines in the captured image in accordance with some embodiments.
Figure 10A:
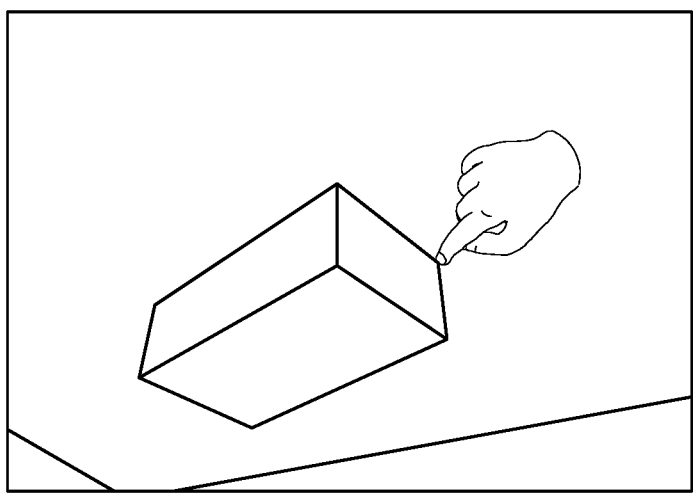
FIG. 10A shows a captured image of a box object in accordance with some embodiments.

Specifically, FIG. 10A shows a captured image of a box object, FIG. 10B shows that some edge lines in the captured image are determined, and FIG. 10C shows that some points in the captured image (e.g., some cross points of the edge lines) are selected as potential corner points of the box object. Typically, corner recognition algorithms will generate more candidate corner points than are actually present on the box object. In the illustrated example, the box object has only eight actual corner points. Examples disclosed herein utilize the ability of the imaging system 50 to recognize a user appendage to identify and/or confirm the candidate corners in the image data as corresponding to actual corners of the box object. In some examples disclosed herein, a user is instructed to point to or to touch the actual corners of the box object to distinguish between the actual corner points of the box object and any false candidate corner points of the box object. Advantageously, the user's confirmation and/or indication of the actual corners of the box object accelerates the processing time of the dimensioning system, because the processors no longer need to complete the time-intensive task of determining which candidate corner points of the box object are actual corner points of the box object.

Figure 11:
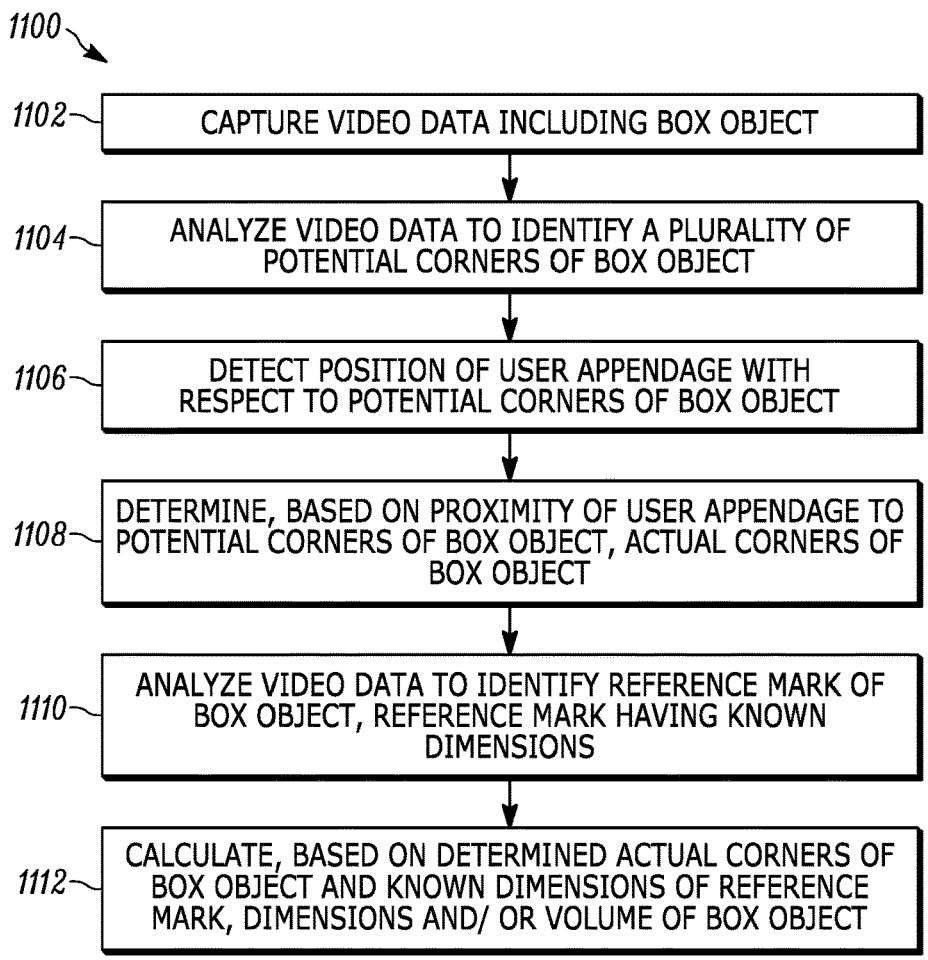
FIG. 11 is a flowchart of a method of determining the dimensions of a box object in accordance with some embodiments.

FIG. 11 is a flowchart of a method 1100 of determining the dimensions of a box object in accordance with some embodiments. A user wearing a HUD may look at a box object to be dimensioned, e.g., as shown in FIG. 5, effectively placing the box object into the field of view of the HUD.

At block 1102, image data including the box object is captured, e.g., via a stereoscopic lens camera mounted on each side of the user's HUD. In some instances, the user may indicate that dimensioning is to begin, e.g., via a voice command, a gesture, the push of a button, etc., and the image data including the box object may be captured in response to the user's indication. In some instances, the user may pick up the box object as shown in FIG. 5, while in other instances (e.g., when the box object is particularly heavy), the user may simply look at the box object.

Figure 12:
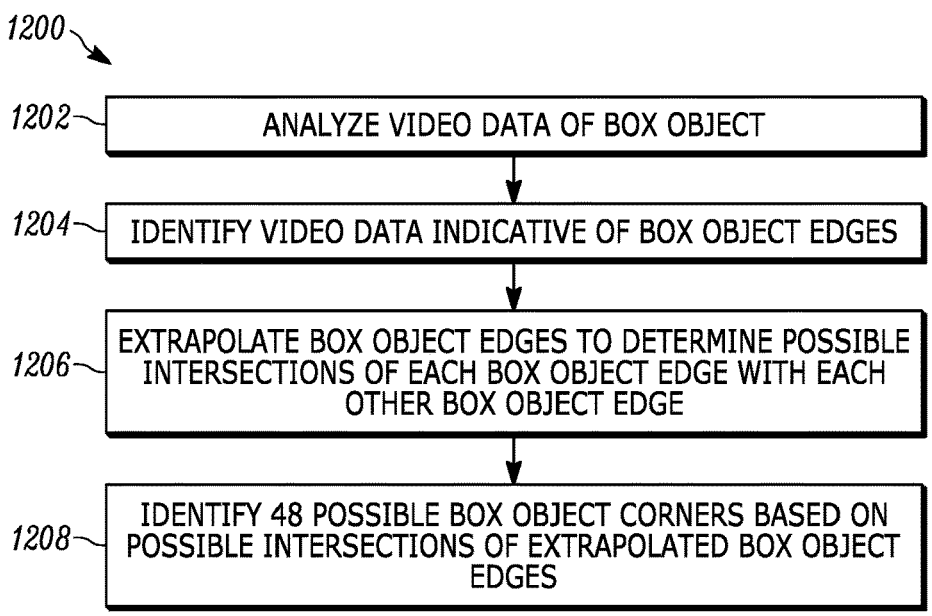
FIG. 12 is a flowchart of a method of analyzing image data to identify a plurality of potential corner points of a box object in accordance with some embodiments.

At block 1104, the image data including the box object is analyzed to identify a plurality of candidate corner points of the box object in the image data, discussed in greater detail with respect to FIG. 12. In the illustrated example, coordinates of the candidate corner points are stored in memory and designated as corresponding to candidate corner points.

The user may point to or touch a corner of the box object, within the field of view of one or both of the stereoscopic lens camera mounted on each side of the HUD. At block 1106, the position of a user appendage (e.g., a finger) with respect to the potential corner points of the box object is determined, e.g., by one or more processors, discussed in greater detail with respect to FIG. 13.

At block 1108, the actual corner points of the box object are determined and/or confirmed by one or more processors based on the proximity of the user appendage to the candidate corner points of the box object. That is, a candidate corner point close to the user appendage (e.g., within a threshold distance or the shortest distance among the plurality of candidate corner points) is likely an actual corner point that the user is touching and/or pointing to.

At block 1110, the image data is analyzed to identify a reference mark of the box object. Specifically, the reference mark has known dimensions. The reference mark is, for example, a standard size shipping label on the box object. In some instance, a bar code associated with the reference mark is analyzed e.g., by one or more processors, and may indicate the dimensions of the reference mark.

At block 1112, the dimensions and/or volume of the box object are calculated based on the known dimensions of the reference mark and the determined and/or confirmed actual corner points of the box object. Example methods and apparatus to determine the dimensions and/or volume of the box object using knowledge of the corners and the reference mark are disclosed in U.S. Pat. No. 9,741,134, which is hereby incorporated by reference herein in its entirety.

FIG. 12 is a flowchart of a method 1200 of analyzing image data to identify a plurality of candidate corner points of a box object, expanding upon block 1104 of FIG. 11. At block 1202, image data including the box object may be analyzed, e.g., by one or more processors. The analysis includes, for example, smoothing such as Gaussian Blur, detection such as Canny algorithm, Hough transform algorithm with contour detection, Convex Hull algorithm, etc. Example methods and apparatus to utilize image processing algorithms are disclosed in U.S. Pat. No. 9,741,134, which is hereby incorporated herein by reference. At block 1204, image data indicative of box object edges is identified, e.g., by one or more processors based on the analysis of block 1202.

At block 1206, the box object edges are extrapolated to determine possible intersections of each box object edge with each other box object edge, e.g., as shown in FIG. 10C. At block 1208, possible box object corners are identified based on possible intersections of extrapolated box object edges. Generally, as shown in FIG. 10C, there will be many candidate box object corners identified by the system, but only eight actual box object corners on the box object.

Figure 13:
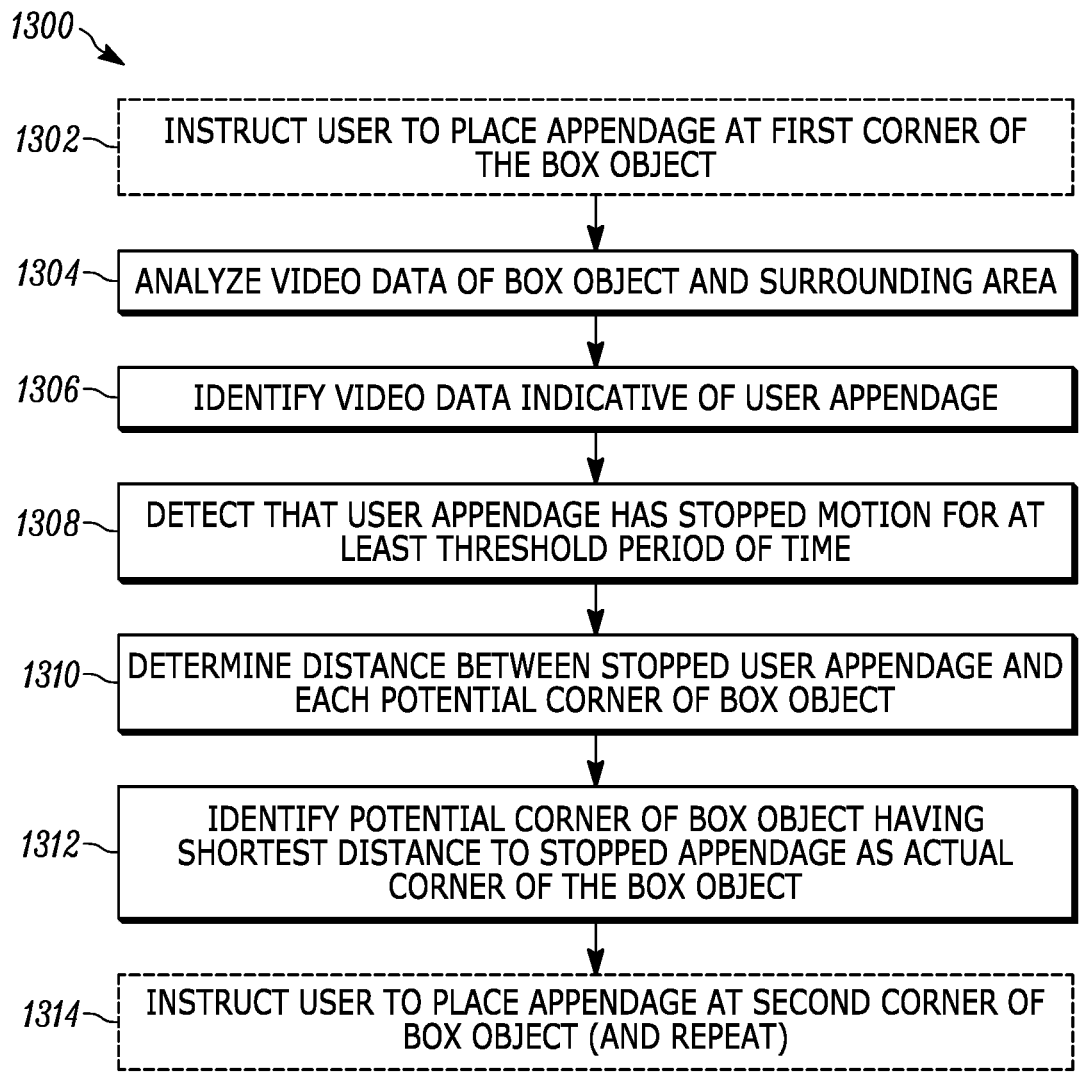
FIG. 13 is a flowchart of a method of detecting the position of a user appendage with respect to potential corners of the box object in accordance with some embodiments.

FIG. 13 is a flowchart of a method 1300 of detecting the position of a user appendage (e.g., a finger) with respect to potential corners of the box object, expanding upon block 1106 of FIG. 11.

At block 1302, a user may be instructed to place an appendage (e.g., a finger) at a first corner of the box object. For instance, the audio generator 112 of the presentation generator 102 may provide audio instructions, e.g., "please touch top right corner," or "please point to first corner." Additionally or alternatively, the image generator 106 of the presentation generator 102 may provide similar visual and/or textual instructions.

At block 1304, image data of the box object and surrounding area are analyzed by, for example, one or more processors. Based on the analysis, image data indicative of a user appendage is identified at (block 1306). In some instances, the analysis may include identifying a bare appendage, e.g., based on color, shape, etc. In some instances, the user may wear a distinctive (e.g., recognizable to the system based on a known image) glove, and the image data indicative of the user appendage is image data indicative of the glove. For example, the glove might be a particular color configured for rapid contrast-based identification or the glove may include a particular marking or shape known to the system to be located on a finger tip of the glove. In some instances, the glove may include a light and/or other visually identifiable indicator that may be identified by analyzing the image data.

At block 1308, a stop in motion of the user appendage is detected. For instance, if the user appendage has been identified in the image data and has stopped moving for a threshold period of time (e.g., five seconds), this indicates that the user is currently touching or pointing at the first corner of the box object. Additionally or alternatively, in some examples in which the user wears a glove, the user may push a button or otherwise activate an ultra-small Bluetooth low energy (BLE) radio mounted or electronic circuitry printed into the finger of the glove to indicate that the user is currently touching or pointing at the first corner of the box object. That is, the BLE radio may transmit a signal detectable by a sensor 118 of the presentation generator 102 of the HUD 200.

At block 1310, once the user has indicated (e.g., by stopping, pushing a button, etc.) that he or she is pointing at or touching the first corner point of the box object, the distance between the user appendage and each of the candidate corner points of the box object is determined, e.g., by one or more processors. That is, the processor(s) analyze the image data to determine relative positions of each of the identified candidate corner points and the user appendage, and determine the distance between the user appendage and each candidate corner point.

At block 1312, the candidate corner point having the shortest distance to the stopped user appendage is identified, e.g., by one or more processors, as an actual corner of the box object. That is, the corner point having the shortest distance to the stopped user appendage will likely be the corner point that the user is touching or pointing to.

At block 1314, once the first actual corner point is identified, the user may be instructed to place the appendage at a second corner of the box object, and the second corner point of the box object may be identified in a similar manner as method 1300 repeats. This method may repeat until all corner points of the box object are identified, or until a number of corner points of the box object sufficient for dimensioning are identified.

As described above, with the coordinates of the actual corners and the known size of the reference points (e.g., the size of a shipping label recognized in the image data), the dimensions of the box object (e.g., the lengths of the edges) is determined using, for example, the methods and apparatus disclosed in U.S. Pat. No. 9,741,134.

The benefits, advantages, solutions to problems, and any element(s) that may cause any benefit, advantage, or solution to occur or become more pronounced are not to be construed as a critical, required, or essential features or elements of any or all the claims.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

We claim:

1. A computer-implemented method, comprising:
    capturing, by a plurality of cameras, image data representative of an object;
    analyzing, by a processor, the image data to identify a plurality of candidate corners of the object;
    detecting, by the processor, a proximity of an appendage to each of the candidate corners;
    confirming, by the processor, based on respective proximities of the appendage to the candidate corners of the object, that a first one of the candidate corners is a corner of the object; and
    calculating, by the processor, based on the confirmed corner of the object, a dimension of the object
    wherein detecting a proximity of the appendage to one of the candidate corners of the object and confirming that the first one of the candidate corners is a corner of the object comprise:
    analyzing the image data to identify portions of the image data indicative of the appendage;
    detecting that the appendage has stopped moving for a threshold period of time;
    determining a distance between the stopped appendage and each of the candidate corners; and
    identifying the first one of the candidate corners as having a shortest distance to the stopped appendage of the user.

2. The computer-implemented method of claim 1, wherein analyzing the image data to identify the candidate corners of the object comprises:
    identifying, by the processor, portions of the image data indicative of one or more edges of the object;
    extrapolating, by the processor, the one or more edges of the object to determine a plurality of intersections of the edges; and
    identifying, by the processor, the candidate corners of the object based on the intersections of the edges.

3. The computer-implemented method of claim 1, further comprising:
    instructing a user to place the appendage at a first corner of the object prior to determining the distance between the stopped appendage and each of the candidate corners.

4. The computer-implemented method of claim 3, further comprising:
    after confirming the corner of the object, instructing the user to place the appendage at a second corner of the object.

5. The computer-implemented method of claim 1, further comprising:
    detecting, by a sensor, a signal emitted by a transmitter associated with the appendage of the user, the signal generated in response to a tactile action by the user.

6. The computer-implemented method of claim 5, wherein detecting the proximities comprises:
    detecting a first proximity of the appendage to one of the candidate corners in response to detecting the signal emitted by the transmitter associated with the appendage.

7. The computer-implemented method of claim 1, wherein calculating the dimension of the object comprises:
    determining a length of an edge of the object.

8. The computer-implemented method of claim 1, wherein:
    calculating the dimension of the object comprises analyzing the image data to identify a reference mark associated with the object, the reference mark having a known dimension; and
    calculating the dimension of the object is based on the known dimension of the reference mark.

9. The computer-implemented method of claim 8, wherein calculating the dimension of the object comprises:
    determining, based on the corner of the object, a length of each edge of the box object; and
    determining, using the lengths of the edges, a volume of the object.

10. A system, comprising:
    a heads-up display assembly comprising a presentation generator and a head mount, the heads-up display assembly configured to be worn by a user;
    a plurality of cameras mounted to the heads-up display assembly, the cameras configured to capture image data associated with an object and an appendage of the user;
    a memory configured to store computer executable instructions; and
    a processor configured to interface with the presentation generator, the plurality of cameras, and the memory, and configured to execute the computer executable instructions to cause the processor to:
        analyze the image data associated with the object to identify a plurality of candidate corners of the object;
        detect a proximity of the appendage of the user to a first one of the candidate corners of the object;
        determine, based on the proximity of the appendage to the first one of the candidate corners, whether the first one of the candidate corners is an actual corner of the object; and
        when the first one of the candidate corners is an actual corner of the object, calculate a dimension of the object based on the first one of the candidate corners
    wherein the computer executable instructions cause the processor to detect the proximity of the appendage to the first one of the candidate corners by:
    detecting that the appendage has stopped moving for a threshold period of time; and
    responsive to detecting that the appendage has stopped moving for the threshold period of time, determining a distance between the stopped appendage of the user and the first one of the candidate corners.

11. The system of claim 10, wherein the computer executable instructions cause the processor to, when executed, identify the candidate corners by:
    identifying data indicative of one or more edges of the box object;
    extrapolating the one or more edges of the object; and
    identifying the candidate corners of the object based on intersections of the extrapolated edges.

12. The system of claim 10, wherein the computer executable instructions cause the processor to:
    instruct the user to place the appendage at a first corner of the object prior to determining the distance between the stopped appendage and the first one of the candidate corners.

13. The system of claim 12, wherein the computer executable instructions cause the processor to:

instruct, after determining that the first one of the candidate corners is an actual corner of the object, the user to place the appendage at a second corner of the object.

14. The system of claim 10, further comprising a sensor, wherein the computer executable instructions cause the processor to detect, via the sensor, a signal emitted by a transmitter worn by the user, the signal generated in response to a tactile action by the user.

15. The system of claim 14, wherein the computer executable instructions cause the processor to detect the proximity of the appendage to the first one of the candidate corners of the object in response to the signal emitted by the transmitter.

16. The system of claim 14, wherein the computer executable instructions cause the processor to calculate the dimension of the object by determining a length of an edge of the object.

17. The system of claim 16, wherein:
the computer executable instructions cause the processor to analyze the image data to identify a reference mark associated with the object, the reference mark having a known dimension; and
the computer executable instructions cause the processor to calculate the dimension of the object based on the known dimension of the reference mark and the determined length of the edge.

18. The system of claim 10, wherein the computer executable instructions cause the processor to calculate the dimension of the object by:
determining a length of an edge of the object; and
determining, using the length of the edge of the object, a volume of the object.

* * * * *